(12) United States Patent
Lucignano et al.

(10) Patent No.: US 10,993,008 B2
(45) Date of Patent: Apr. 27, 2021

(54) COMPOSITE MULTILAYER FILTERING CONSTRUCTION FOR USE AS A SUBCOMPONENT IN ACOUSTIC AND ELECTRONIC PRODUCTS IN GENERAL

(71) Applicant: SAATI S.P.A., Appiano Gentile (IT)

(72) Inventors: Carmine Lucignano, Appiano Gentile (IT); Anna Muzyczuk, Appiano Gentile (IT); Elisa Grimoldi, Appiano Gentile (IT); Marco Mietta, Appiano Gentile (IT); Paolo Canonico, Appiano Gentile (IT)

(73) Assignee: SAATI S.P.A., Appiano Gentile (IT)

( * ) Notice: Subject to any disclaimer, the term of this patent is extended or adjusted under 35 U.S.C. 154(b) by 209 days.

(21) Appl. No.: 16/075,933

(22) PCT Filed: May 24, 2016

(86) PCT No.: PCT/IB2016/000707
§ 371 (c)(1),
(2) Date: Aug. 6, 2018

(87) PCT Pub. No.: WO2017/134479
PCT Pub. Date: Aug. 10, 2017

(65) Prior Publication Data
US 2019/0052945 A1   Feb. 14, 2019

(30) Foreign Application Priority Data
Feb. 4, 2016   (IT) .................. 102016000011757

(51) Int. Cl.
*H04R 1/08*   (2006.01)
*H04R 1/02*   (2006.01)
(Continued)

(52) U.S. Cl.
CPC .............. *H04R 1/086* (2013.01); *B32B 5/26* (2013.01); *B32B 7/04* (2013.01); *B32B 7/14* (2013.01);
(Continued)

(58) Field of Classification Search
CPC ........ B01D 2239/0654; B01D 2325/02; B01D 2325/38; B01D 69/10; B01D 71/36; B32B 2307/10; B32B 7/04
See application file for complete search history.

(56) References Cited

U.S. PATENT DOCUMENTS 8,685,198 B2 *   4/2014   Mietta ..................... B32B 3/266
                                                                            156/291
9,131,315 B2 *   9/2015   Mietta .................... H04R 19/04
(Continued)

FOREIGN PATENT DOCUMENTS

WO   2008/118955 A1   10/2008
WO   2008/150548 A2   12/2008
(Continued)

OTHER PUBLICATIONS

International Search Report for PCT/IB2016/000707 dated Oct. 25, 2016.
(Continued)

*Primary Examiner* — Ana M Fortuna
(74) *Attorney, Agent, or Firm* — Hedman & Costigan, P.C.; James V. Costigan; Kathleen A. Costigan

(57) ABSTRACT

A composite multilayer filtering construction for use in filtering applications requiring a high filtering efficiency for particles of the order of microns and a high permeability of the filtering medium, and for use as a sub-component within acoustic and electronic products, in particular microphones and speakers, comprises at least a first layer of polymeric nanoporous membrane and at least a second layer of a
(Continued)

synthetic monofilament precision fabric, the first polymeric nanoporous membrane layer being coupled to the second precision fabric layer thereby providing an integral filtering medium adapted to prevent a passage therethrough of particles even of 1-2 µm and of pressurized liquids.

12 Claims, 4 Drawing Sheets

(51) Int. Cl.
    *B32B 7/14*    (2006.01)
    *B32B 7/04*    (2019.01)
    *B32B 5/26*    (2006.01)
    *H04R 25/00*    (2006.01)

(52) U.S. Cl.
    CPC .......... *H04R 1/023* (2013.01); *B32B 2250/20* (2013.01); *B32B 2255/02* (2013.01); *B32B 2262/02* (2013.01); *B32B 2262/023* (2013.01); *B32B 2262/0253* (2013.01); *B32B 2262/0261* (2013.01); *B32B 2262/0276* (2013.01); *B32B 2307/10* (2013.01); *B32B 2457/00* (2013.01); *H04R 25/654* (2013.01); *H04R 2410/07* (2013.01); *H04R 2499/11* (2013.01)

(56) References Cited

U.S. PATENT DOCUMENTS

| | | | |
|---|---|---|---|
| 2012/0128943 A1* | 5/2012 | Wangbunyen | B29C 66/727 428/195.1 |
| 2015/0224738 A1* | 8/2015 | Gallagher | B29C 65/5042 442/1 |
| 2018/0036669 A1* | 2/2018 | Canonico | D04H 1/728 |
| 2019/0124427 A1* | 4/2019 | Lucignano | B32B 7/14 |

FOREIGN PATENT DOCUMENTS

| | | |
|---|---|---|
| WO | 2010/124899 A1 | 11/2010 |
| WO | 2011/132062 A1 | 10/2011 |

OTHER PUBLICATIONS

Written Opinion of the International Searching Authority dated Oct. 25, 2016.

\* cited by examiner

COMPOSITE MULTILAYER FILTERING CONSTRUCTION FOR USE AS A SUBCOMPONENT IN ACOUSTIC AND ELECTRONIC PRODUCTS IN GENERAL

BACKGROUND OF THE INVENTION

The present invention relates to a composite multilayer filtering construction to be used, in particular, and not exclusively, within acoustic and electronic products in general.

As is known, in acoustic applications, sound is transmitted either by air passing through a porous surface, or by vibrations of a very thin material, such as a film or a membrane.

The transmission by passing air generally occurs through a fabric material designed for protecting, for example, a microphone or loudspeaker, or electronic apparatus in general, against undesired solid particles, but not against water or other fluids.

The sound transmission by vibrations, in turn, is typical in loudspeakers or electronic apparatus in general, and must also be designed to protect against water and liquid penetrations.

Further known is the fact that the sound transmission by passing air is better than the vibration sound transmission, thereby an ideal filtering medium should have the acoustic characteristics of the fabric and the protective properties of a membrane.

SUMMARY OF THE INVENTION

Accordingly, the aim of the present invention is to provide such a composite filtering construction having very good acoustical characteristics as well as optimum protective characteristics for the electronic apparatus to which the composite filtering construction is to be applied.

Within the scope of the above mentioned aim, a main object of the present invention is to provide such a filtering construction of the above indicated type allowing a very accurate and selective filtering, together with a satisfactory capability of resisting against a possible penetration or leakage of liquids.

Another object of the present invention is to provide such a filtering construction of the above indicated type which has a very long operating life, even equal to that of the acoustic component the construction is to be applied to.

Yet another object of the present invention is to provide such a composite construction of the above indicated type which, besides its good protective characteristics against solid particles and liquids, also has an acoustic impedance lower than that of currently used approaches, so as to be applied not only in acoustic applications, but also in those applications in which the construction should protect the related devices against smaller and smaller particles, and for which the protective medium or fabric should have correspondingly smaller and smaller mesh openings.

Yet another object of the present invention is to provide such a composite construction of the above indicated type which may be handled and processed in a very simple manner, to make the small size parts typically necessary for the desired applications.

Yet another object of the present invention is to provide such a composite construction of the above indicated type, whose individual filtering components may be easily made, which, in turn, may be easily provided with coupling means for coupling them to the acoustical components and casings thereof.

According to one aspect of the present invention, the above mentioned aim and objects, as well as yet other objects, which will become more apparent hereinafter, are achieved by a composite filtering construction according to claim 1.

Further characteristics of the composite filtering construction according to the present invention are defined in the dependent claims.

BRIEF DESCRIPTION OF THE DRAWINGS

Further details and advantages of the composite filtering construction according to the present invention will become more apparent hereinafter from the detailed disclosure of a currently preferred embodiment thereof being shown, by way of an indicative but not limitative example, in the schematic accompanying figures, where.

DESCRIPTION OF THE PREFERRED EMBODIMENTS

Figure 1:
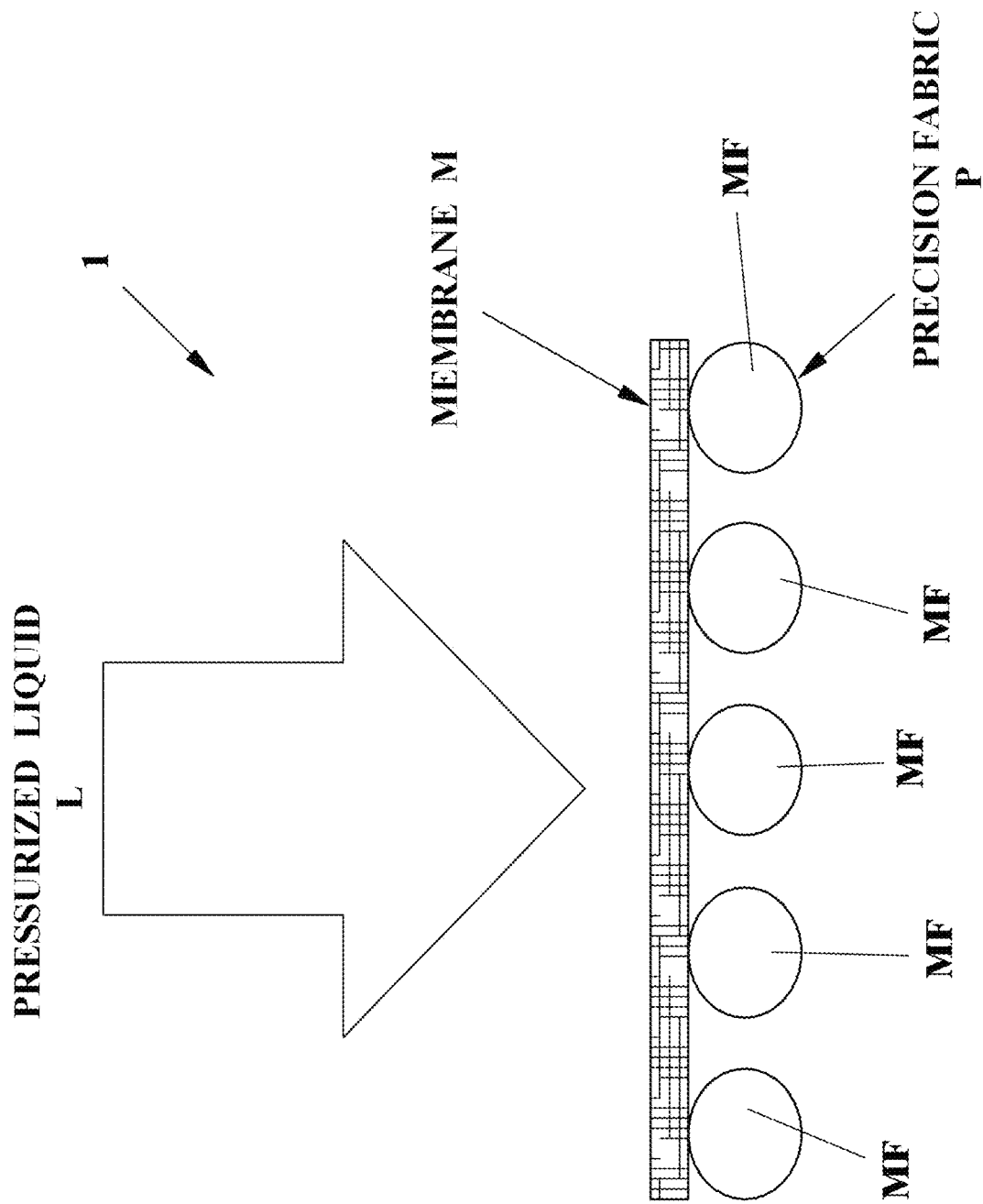
FIG. 1 is a schematic cross sectional view of a currently preferred embodiment of the composite filtering construction according to the present invention.

With reference to the above mentioned figures, the composite filtering construction according to the present invention comprises, as a first main component, a precision fabric T including even "meshes" or openings (for example being made of a synthetic monofilament and having a square-mesh configuration).

The very even mesh opening construction, which is consistent through the overall fabric, together with its high mechanical strength and processing capabilities, make such a precision monofilament fabric material T an ideal solution as a filtering basic material.

These very even fabric materials have more constant properties with respect to their weight and thickness, surface properties, and temperature characteristics, than conventional multi-filament fabrics.

The characteristic evenness is constantly held along the overall fabric roll, from batch to batch.

Moreover, the fabrics T according to the invention are made with very narrow making tolerances, thereby providing a filtering medium having a consistent filtering efficiency and a related specific air flow permeability.

The constant and consistent characteristics are just a result of the even opening or pore size of the monofilament material used for the weaving operation.

Moreover, the subject precision fabric materials have a very good resistance against atmospheric agents, water and moisture and may be produced on an industrial scale with a very stable and reproducible quality.

More specifically, the precision fabrics used in the invention are made starting from a yarn having a very high elastic module, thereby the precision fabric T will be a barely deformable material, which is very important, for example, for the intended acoustic applications of the invention.

Likewise, the characteristic property of these fabrics having a very low "CREEP" or a related very low "STRESS RELAXATION", differently from most of the materials constituting the commercially available filtering constructions, is very important for such applications.

The main aspect of the present invention is that the invention provides a composite filtering system including two or more coupled or laminated material layers, of which at least one layer, as mentioned, is made of a synthetic monofilament square mesh or opening precision fabric MF and at least another layer, or second basic component, consists of an air permeable micro- or nanoporous membrane M.

Said membrane M allows air to pass therethrough while restraining any undesired particles, whereas the fabric T provides the nanoporous membrane M with the desired structural resistance or strength, while satisfactorily performing its filtering function.

From tests carried out by the Applicant, it has been found that for the specific applications of the composite filtering construction of the invention in the acoustic field, the membrane M (or porous film) should have an air permeability from 5 to 150 l/m²s at a pressure loss of 200 Pa; a thickness from 2 to 60 μm and a typical pore size from 150 nanometers to 3 μm.

According to the present invention, the membrane M is coupled to the monofilament fabric T by several laminating or coupling methods, such as a reactive polyurethane (PU) coupling, an ultrasound (US) laminating and other coupling methods, thereby making the membrane M and the supporting fabric T an integral unit, to provide, according to a further main aspect of the invention, a single filtering medium or composite construction.

As stated, the fabric T provides the membrane M with the required structural strength, while performing its filtering function.

According to a further aspect of the present invention, it is also possible to deposit a membrane M layer on both sides or faces of the fabric T and/or to laminate or connect said membrane to an additional fabric T thereby providing a "sandwich" of fabric T with the membrane M contained therein.

With reference to FIG. 1, the composite construction herein shown comprises, for example, two layers, that is a bottom layer of a synthetic monofilament precision fabric T, preferably made of polyester, and a top layer of a nanoporous membrane M, having a "high" air permeability, preferably made of a PTFE material, for example by a stretching process in which the starting film is suitably stretched, or made of a PVDF material by the same process or an electrospinning process.

In the preferred embodiment of the invention, in order to optimize the mechanical properties of the fabric T, the membrane M is arranged outside, that is in contact with a pressurized liquid L (FIG. 1), whereas the fabric T is arranged inside, thereby favouring a reaction equal and contrary to the force applied by the pressurized liquid L, in particular operating on the monofilament MF of the fabric T itself.

In this connection it should be apparent that, by reducing the mesh size of the fabric T, it would be possible to increase the stiffness of the membrane M, thereby causing a smaller deformation of said membrane during its use. In this connection, however, it should be pointed out that for a larger number of monofilaments MF, the fabric T will cause an increased weight of the structure, supposing that the diameter of the monofilament MF is preset.

Since the basic aim of the present invention is to provide an optimized sound transmission by means of the two above mentioned sound transmission mechanisms, that is air passage and medium vibration, an increase of weight of the fabric T will have as a consequence deteriorated acoustic performances.

Figure 2:
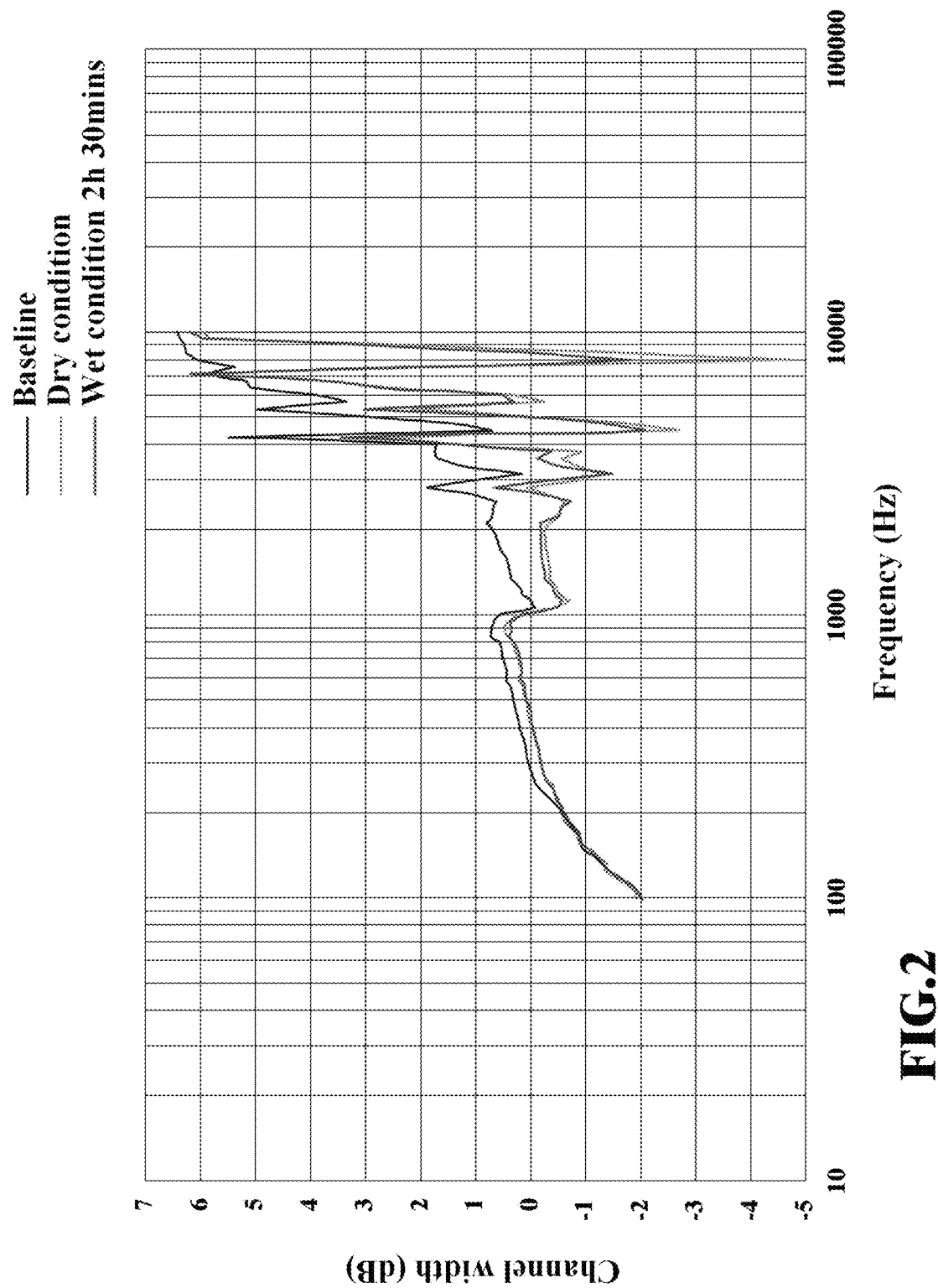
FIG. 2 is a diagram showing the acoustical characterization of the laminated or coupled material comprising the fabric and the membrane according to the main aspect of the composite filtering construction of the present invention.

With reference to FIG. 2, it shows, as stated, a diagram illustrating the acoustical characterization of the fabric+ membrane laminated material according to the present invention.

This diagram shows, in particular, the frequency response of the microphone used for the characterization (baseline) of said microphone itself, and in addition the "die-cut" part of the composite construction in a dry condition, and in addition the die-cut part of the composite construction after having performed a suitable water intrusion test.

In all the three mentioned cases, a same speaker is used, emitting sound of a given sound pressure level, in this case 94 dB.

From the Δ (delta) between the "baseline" and the second curve, it would be possible to determine accordingly the acoustical attenuation, or insertion loss, due to an interposition of the composite construction of the invention between the microphone and the speaker.

FIG. 2 also shows that the two curves have a quite similar configuration, and that the attenuation value is very reduced and typically below 1.5 dB.

Likewise, by comparing the second and third curves, it is possible to determine the further attenuation due to possible modifications of the material, as a consequence of the above mentioned water intrusion test.

In this specific case, it can be seen that the mentioned delta is nearly zero, which would correspond to an optimum performance and water penetration resistance, which water, in the specific disclosed case, is forced to impact on the surface of the membrane (sample with diameter from 1 to 6 mm) with a water pressure of 300 mbar for thirty minutes.

Figure 3:
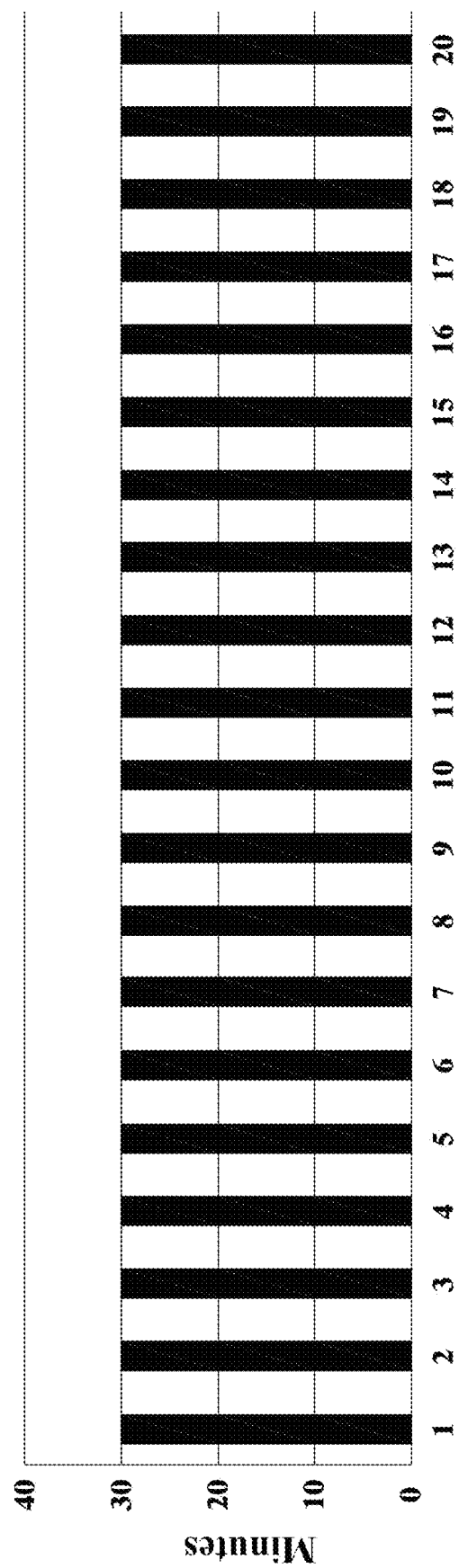
FIG. 3 is a further diagram showing the results of the so-called "water intrusion" test.

FIG. 3, as stated, is a diagram showing the results of the water intrusion test, in which samples of the composite construction with diameter from 1 to 6 mm have been subjected to a water intrusion test at 200 mbar for 30 minutes.

At the end of the test, the sample surface is observed to detect a possible presence of water droplets susceptible to pass through the composite construction of the invention.

As shown by the diagram of FIG. 3, none of the tests was interrupted before 30 minutes, since in no case it was possible to detect water.

Figure 4:
FIG. 4 shows a SEM image of a sample of the composite filtering construction according to the present invention.

From FIG. 4, which is a SEM image of a sample of the composite construction of the invention, it is possible to see a nanoporous membrane M made of PTFE, deposited on a polyester precision fabric T.

The bearing points of the membrane on the fabric can be clearly seen as the regions having a lighter tone.

According to the present invention, the organic polymers constituting the membrane may be selected from: PTFE or derivatives thereof, PVDF, PA 6, PA 6/12, polyaramides, PUR, PES, PVA, PVAC, PAN, PEO, PS, as well as conductive polymers (polythiophenes), fluorinated polymers, biopolymers and so on.

Said biopolymers may comprise kitosan, keratin, collagen, peptides and so on.

The selection of the basic fabric T, with respect to the mesh opening, density, thickness and air permeability of the membrane M, thickness of the laminated layer and polymer constituting said membrane M, of course will be made based on the characteristics required for the intended specific application.

In particular, in studying the laminated filtering construction of fabric/membrane, a selection of fabrics by SAATI (i.e. the Applicant of the present application) and a selection of polymers to be used for the membrane M were used.

The membrane and sublayer to be laminated have been so studied as to achieve a maximum filtering efficiency with such a pressure loss and air permeability as to provide small acoustic losses in dB, both in a dry and in a wet condition.

As stated, the membrane which may be used for such an application may be made by different making methods, such as phase inversion, electrospinning of nanofibers and thermomechanical stretching of the polymeric film.

In the preferred embodiment of the present invention, membranes of ePTFE, that is of PTFE and made by thermomechanical stretching a PTFE film, have been used.

In any case, the main aspect is that of the physical-geometrical properties of the composite construction according to the invention, which should have an air permeability from 5 to 150 l/m² sec for a pressure drop of 200 Pa, and a thickness from 2 to 60 μm, and a typical pore size from 150 nanometers to 3 μm.

The membrane properties comprise a greater specific surface/high surface-volume ratio, smaller pore dimensions, a high porosity, tridimensional characteristics, a high permeability/low resistance to the air passage, a good separation of the particles, a high capability of restraining powder, improved physical-mechanical properties, and specific functional properties providing a self-evident "gain" in the terms of the fiber active area, improved filtering properties and self-evident flow advantages.

Thus, fabrics with improved performances and functional for specific applications are accordingly made.

The parameters of the process for coupling or laminating the fabric to the membrane may be changed in order to provide filtering systems with different filtering properties.

In the practical experimental tests carried out on the present invention, the most significant parameters have been detected, and the related tests have been repeated while varying the values of said parameters, up to optimize the end product, so as to achieve geometrically, dimensionally and structurally homogeneous fibers providing a homogeneous distribution of the pore dimensions with a filtering of micrometric size particles, with a high filtering efficiency, while holding a controlled high permeability by modulating the thickness of the layer and the average size of the membrane pores.

The samples have been characterized in the following terms:
a flow resistance of the laminated material made by a measurement of the air permeability;
a sound passage resistance by measuring the acoustic impedance;
a water intrusion resistance in given conditions;
a sound passage resistance after the water intrusion test.

Several samples of a polyester fabric coated by PTFE polymeric membranes have been made and characterized.

The most significant results are shown here below:
A polyester fabric coated by an ePTFE membrane
Characteristics of the base fabric:
Mesh opening=85 μm
Open area 60%
Centrimetric density 90 threads/cm
Thread diameter 24 μm
Air permeability>10000 l/m²s @ 200 Pa
CA Fibrodat>100°
Properties of the starting membrane
Thickness: 8 μm
Air permeability: 30 l/m²s @ 200 Pa
Pore size 0.3-0.5 μm FIG. 2, as mentioned, shows an acoustic characterization of the fabric+membrane laminated or coupled material. From the deltas of the three curves, it is possible to determine the dB Loss due to an interposition of the composite construction between the speaker and microphone, and the dB Loss thereof, upon performing the water intrusion test.

A very important advantage is that the composite construction of the invention allows to achieve a higher permeability compared to conventional membranes.

Moreover, the present construction allows to make filtering media having a 99% efficiency up to 2 μm and accordingly a high filtering efficiency for particles<5 μm (which is the current limit of the filtering precision fabrics).

Moreover, the composite filtering construction of the present invention has an improved capability of restraining liquids on the filtering fabric.

It has been found that the invention fully achieves the intended aim and objects.

In fact, the composite construction according to the present invention provides the filtering precision and selectivity typical of a precision fabric jointly with a good liquid restraining capability.

Said construction has an acoustical impedance lower than that of the membranes alone (a main characteristic for acoustic applications in which the fabric provides at present a protective function of the inner parts of the cellular phone against powder and liquids, thereby smaller and smaller mesh openings with low impedance are required, so as not to reduce the sound passing through).

In addition, the present composite construction allows to overcome the use limits of conventional membranes due to the poor mechanical strength of these constructions which, if not properly supported by the monofilament precision fabric, cannot stand a passage of flows which are typical of filtering systems.

Yet another advantage of the composite construction of the invention is that it may be easily machined, for example by "die-cutting", to provide a plurality of filtering modular units with which it is possible to easily associate for example bioadhesive polymeric strips, as suitably contoured and structured and coupled to each die-cut filtering modular unit, thereby providing the perspiring properties of the composite construction in the active part thereof while allowing an adhesion/assembling of each filtering module, with an interposition of suitable gaskets, to the acoustic components to be protected, and to the casing or outer housing of the related electronic device, for example a mobile phone, tablet or computer.

In addition, while through the preceding disclosure specific values of the main parameter of the filtering construction according to the invention have been indicated, these values should be considered as modifiable by the term "about".

In practically making the composite filtering construction of the present invention, the materials used, as well as the contingent size and shapes, can be any, according to requirements.

The invention claimed is:

1. A composite multilayer filtering construction for use in filtering applications requiring a high filtering efficiency for particles of the order of microns and a high permeability of the filtering medium, and for use as a sub-component within acoustic and electronic products, characterized in that said multilayer construction comprises at least a first layer of polymeric nanoporous membrane and at least a second layer of a synthetic monofilament precision fabric, said first polymeric nanoporous membrane layer being coupled to said second precision fabric layer by a laminating method thereby providing an integral filtering medium adapted to prevent a passage therethrough of particles of 1-2 μm and pressurized liquids.

2. A composite construction, according to claim 1, characterized in that said at least a first polymeric nanoporous membrane layer and said at least a second synthetic monofilament fabric layer are coupled by said laminating method selected from a reactive polyurethane (PU) method and an ultrasound (US) method.

3. A composite construction, according to claim 1, characterized in that said composite construction is laminated with two biadhesive polymeric strip elements, as suitably contoured, to hold the perspiring properties of the composite construction at an active part thereof while allowing said construction to be adhered/assembled by gaskets to the acoustic component to be protected and to an outer casing of the electronic device, such as a mobile phone, tablet, computer.

4. A composite construction, according to claim 1, characterized in that in said composite construction said membrane is so coupled as to face an inlet direction of said pressurized liquids.

5. A composite construction, according to claim 1, characterized in that said synthetic monofilament precision fabric is a square mesh or opening precision fabric made of a material selected from polyester, polyamide, polypropylene, polyphenylensulfide, PEEK, PVDF, PTFE, in an opening range from 2000 μm to 5 μm.

6. A composite construction, according to claim 1, characterized in that said first nanoporous membrane layer consists of a polymeric material selected from: PTFE and derivatives thereof, PVDF, PA6, PA6/12, polyaramide, PUR, PES, PVA, PVAC, PAN, PEO, PS, conductive polymers and/or biopolymers selected from kitosan, keratine, collagen, peptides, and so on, in a mesh opening range from 100 nm to 3 μm.

7. A composite construction, according to claim 1, characterized in that said first nanoporous membrane layer is made by a dipping process.

8. A composite construction, according to claim 1, characterized in that said coupling is selected from reactive hotmelt coupling, thermoplastic laminating, hot laminating, ultrasound laminating.

9. A composite construction, according to claim 1, characterized in that in said composite construction said fabric is a polyester fabric coated by an ePTFE membrane, said fabric having a mesh opening of 85 μm; an open area of 60%; a centimetric density of 90 threads/cm; a thread diameter of 24 μm, an air permeability<10000 l/m$^2$s @ 200 Pa; CA Fibrodat>100°, said ePTFE membrane having a thickness of 8 μm, an air permeability of 30 l/m$^2$s @ 200 Pa, and a pore size from 0.3 to 0.5 μm.

10. A composite construction, according to claim 1, characterized in that said composite construction, when arranged between a conventional microphone and a conventional speaker of a cellular phone, has an acoustic attenuation or loss due to an insertion loss lower than 1.5 dB.

11. A composite multilayer filtering construction for use in filtering applications requiring a high filtering efficiency for particles of the order of microns and a high permeability of the filtering medium, and for use as a sub-component within acoustic and electronic products, characterized in that said multilayer construction comprises at least a first layer of polymeric nanoporous membrane and at least a second layer of a synthetic monofilament precision fabric, said first polymeric nanoporous membrane layer being coupled to said second precision fabric layer by a laminating method thereby providing an integral filtering medium adapted to prevent a passage therethrough of particles of 1-2 μm and pressurized liquids, said layer of said nanoporous membrane being coupled to said synthetic monofilament fabric on both faces of said fabric.

12. A composite multilayer filtering construction for use in filtering applications requiring a high filtering efficiency for particles of the order of microns and a high permeability of the filtering medium, and for use as a sub-component within acoustic and electronic products, characterized in that said multilayer construction comprises at least a first layer of polymeric nanoporous membrane and at least a second layer of a synthetic monofilament precision fabric, said first polymeric nanoporous membrane layer being coupled to said second precision fabric layer by a laminating method thereby providing an integral filtering medium adapted to prevent a passage therethrough of particles of 1-2 μm and pressurized liquids, said layer of said nanoporous membrane being laminated between two layers of said synthetic monofilament fabric.

* * * * *